United States Patent
Reed

(12) 
(10) Patent No.: US 8,918,711 B2
(45) Date of Patent: Dec. 23, 2014

(54) SYSTEM AND METHOD FOR VISUALLY PRESENTING ELECTRONIC MEDIA

(76) Inventor: Michael J. Reed, New Braunfels, TX (US)

( * ) Notice: Subject to any disclaimer, the term of this patent is extended or adjusted under 35 U.S.C. 154(b) by 333 days.

(21) Appl. No.: 13/418,341

(22) Filed: Mar. 12, 2012

(65) Prior Publication Data

US 2012/0233539 A1 Sep. 13, 2012

Related U.S. Application Data

(60) Provisional application No. 61/451,464, filed on Mar. 10, 2011.

(51) Int. Cl.
G06F 17/22 (2006.01)
G06F 3/0488 (2013.01)

(52) U.S. Cl.
CPC .................................. *G06F 3/0488* (2013.01)
USPC ............................ 715/234; 715/273; 715/763

(58) Field of Classification Search
None
See application file for complete search history.

(56) References Cited

U.S. PATENT DOCUMENTS

| | | | | |
|---|---|---|---|---|
| 5,802,516 | A | * | 9/1998 | Shwarts et al. ........................ 1/1 |
| 6,144,380 | A | * | 11/2000 | Shwarts et al. ............... 715/863 |
| 6,243,071 | B1 | * | 6/2001 | Shwarts et al. ............... 715/823 |
| 6,407,757 | B1 | * | 6/2002 | Ho ................................ 715/776 |
| 8,347,232 | B1 | * | 1/2013 | Prud'Hommeaux et al. . 715/833 |
| 2008/0229182 | A1 | * | 9/2008 | Hendricks et al. ............. 715/205 |
| 2009/0300539 | A1 | * | 12/2009 | Hendricks ....................... 715/779 |
| 2011/0251837 | A1 | * | 10/2011 | Conboy et al. .................... 704/8 |
| 2012/0311438 | A1 | * | 12/2012 | Cranfill et al. ................. 715/256 |

FOREIGN PATENT DOCUMENTS

WO 2010-112951 * 10/2010

* cited by examiner

*Primary Examiner* — Maikhanh Nguyen
(74) *Attorney, Agent, or Firm* — Jackson Walker, LLP

(57) ABSTRACT

An electronic book reader has an electronic book loaded in memory. The electronic book includes text, as well as markup tags around certain text portions. The markup tags indicate the availability of and link to supplemental content. A touch screen display allows a user to select a category of supplemental content or linked text. The display will show links for the category of content selected by the user, or will show categories of content for the linked text selected by the user.

34 Claims, 13 Drawing Sheets

Figure 1 (Prior Art)

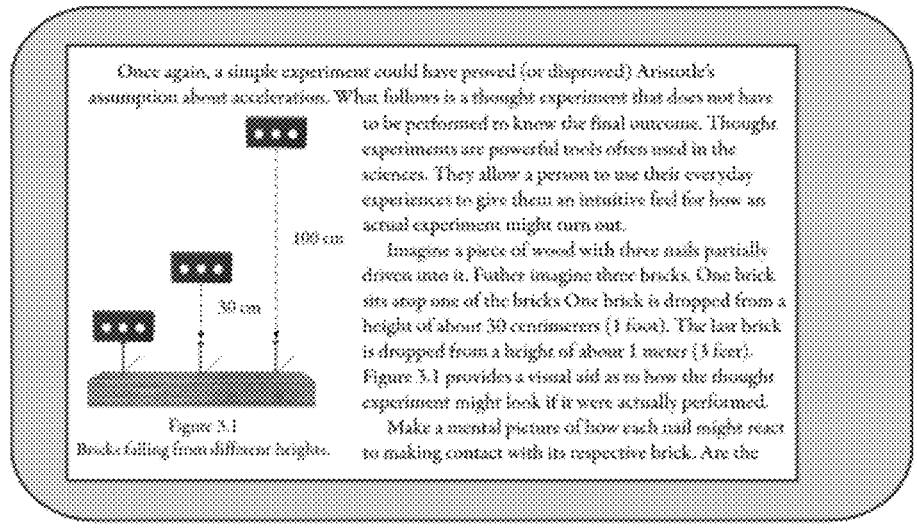
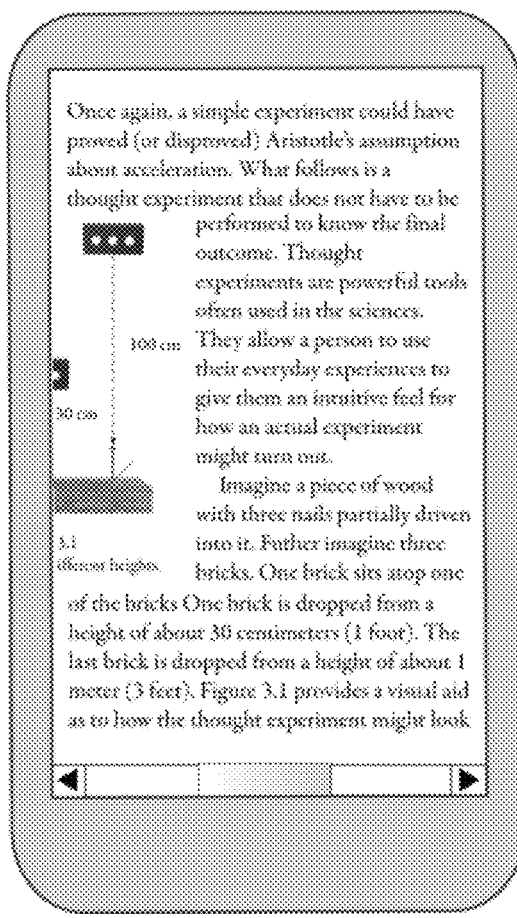
Figure 2 (Prior Art)

 Biographic material
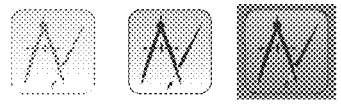 Graphic illustrations
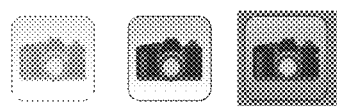 Photographic material
 Animation/Video clips
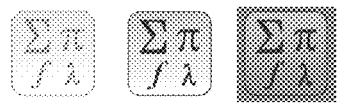 Mathematical detail
 Dictionary definitions
 Timeline of events
 Geographic maps
 Experimental support
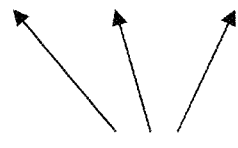
152
Figure 3

A biography

An illustration

A picture

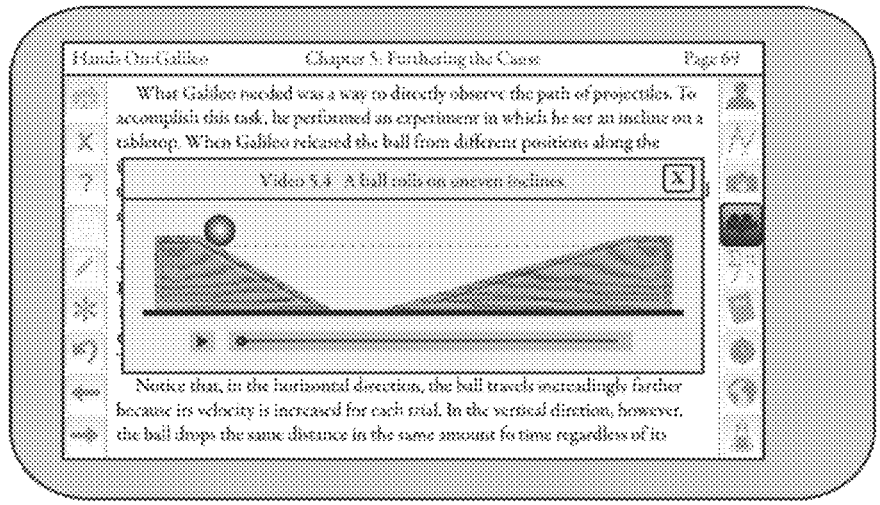
← Figure 10
A video
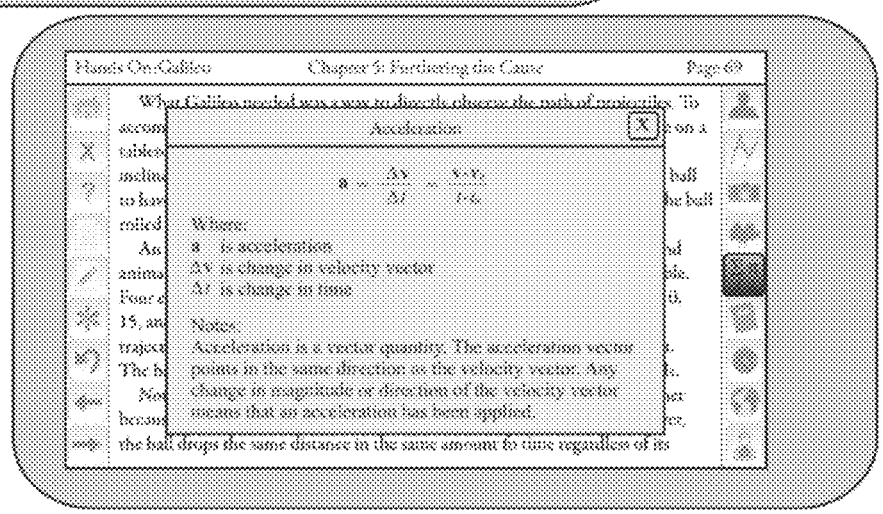
Figure 11 →
An equation
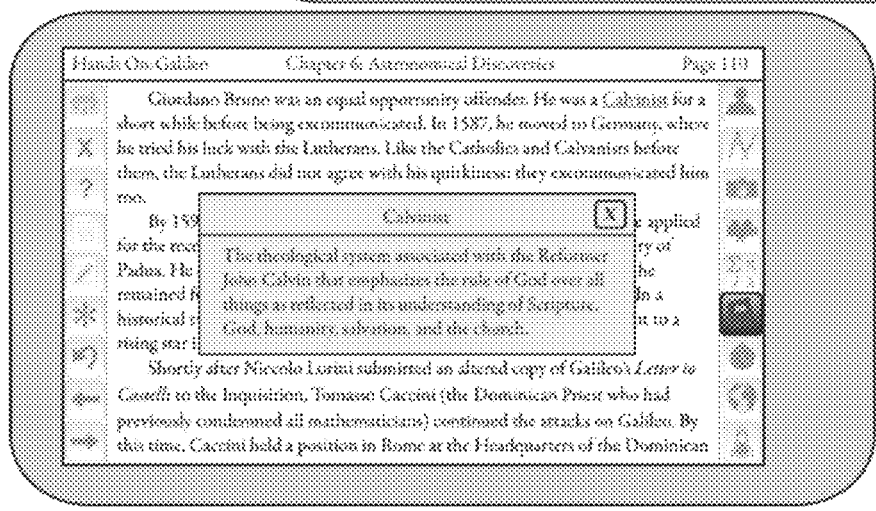
← Figure 12
A definition A timeline A map A laboratory

SYSTEM AND METHOD FOR VISUALLY PRESENTING ELECTRONIC MEDIA

CROSS-REFERENCE

This application claims the benefit of U.S. Provisional Application No. 61/451,464, filed Mar. 20, 2011.

BACKGROUND

This specification relates to the field of consumer electronics and more particularly to an electronic book reader.

Electronic book readers, also called eReaders, display and allow users to read electronic books, also called eBooks, and other electronic reading material. Some devices are dedicated eReader devices for presenting eBooks. Other devices, including personal computers, tablets, and smartphones, may have the capacity to act as eReaders as well as performing other tasks. In many prior art eReaders, the primary design focus has been creating software that allows the user to interact with eBooks like printed books. Thus, eReaders typically provide a means for the user to turn pages, often accomplished through a hardware button, screen icon button, or swipe of the finger across a touch-sensitive electronic screen. The eBook software on eReaders and other devices may also allow the user to perform additional routines commonly associated with reading printed materials, including highlighting text, creating notes, and flagging pages in the book.

Some prior art eReaders support eBooks with enhanced content. An eBook with enhanced content may make supplementary material available by clicking on a link, picture, word, phrase, or other highlighted portion of a document. However, a number of problems surface when using eBooks with enhanced content, particularly when graphics are combined with text.

One problem that arises is that too much supplementary material can be confusing to a user. Consider an electronic screen upon which text is being displayed. The text may be a web page, an electronic book, a business report, or other textual content source. The passages of text displayed on the electronic screen may contain links to supplementary material, such as another text file, a graphic file, a video file, an audio file, an animation file, a link to a web site, or an entry point into a section of computer programming code. However, several questions arise concerning the user interaction with the supplementary content. How will the user be informed that supplementary material exists? How will the user request the supplementary material? How will the supplementary material be displayed once it has been requested? In traditional presentation modes, the existence of supplementary materials is relayed to the user via combinations of highlighting, underlining, or coloring of appropriate text passages. FIG. 1 illustrates such an electronic screen with linked passages of text highlighted and underlined. In this presentation mode, the user typically manipulates an electronic cursor over the highlighted text and performs some action such as pressing a mouse button. For devices with a touch-sensitive electronic screen, the user may simply finger tap on the highlighted area.

As shown in FIG. 1, the text may have numerous branching points that lead to a multitude of supplementary material, making it unclear exactly what the supplementary material relates to. Additionally, under the traditional presentation mode, the format of the supplementary material (text, graphics, audio, video, etc.) is unclear until the material is opened. Further, the inclusion of so many potential branching points breaks the visual continuity of the electronic page, making the text appear broken and jumbled. Content displayed in this manner can be distracting and create difficultly for the user to maintain concentration. Of additional concern is the physical strain on the user's eye.

A second problem of eBooks with enhanced content is the lack of an ability to have multiple materials branching from a single point. A single word, image, or other content element could potentially have multiple supplementary materials available. For example, a reference to "Calvinist" might have a text file presenting biographic material for John Calvin, an audio file offering correct pronunciation, a picture of Calvin, a dictionary definition offering the tenets of Calvinist theology, a timeline of his ministries as they relate to the story, or a map of the location of Calvin's ministries (Geneva, Switzerland). Current presentation modes do not allow for multiple supplementary materials branching from a single point because the assumption is that a single, user-initiated action (mouse-button click or touch-screen tap) will cause a single, specific event to be triggered. This issue arises from the fact that computers (and hence their operating programs) perform optimally when they are making clear-cut, binary decisions. Having multiple possible actions by a computer is considered undesirable because of the lack of consistency in the outcome, which creates a "gray-area" of operation.

A third problem occurs when an eReader or device permits user selectable font sizes when graphics are present in the content. Electronic books are a popular medium for delivery of reading material. Such eBooks typically may be displayed on a multitude of electronic display screens by computer software that interprets information in a file and then displays that material for the user. Individual electronic devices (personal computer, smart phone, eReader, tablet, etc.) often have access to a variety of computer programs that are capable of performing this task.

Standardized coding schemes, such as hypertext markup language (HTML) and extensible markup language (XML), have been developed. Markup languages consist of non-displaying tags that alert the output program as to how to format the text. These tags may include commands to start a new paragraph, turn on/off text output characteristics such as bold or italics, as well as which font style and font size to use in displaying the text. Programming languages such as JavaScript exist for directing logical flow during program execution. Cascading Style Sheets (CSS) are used to determine how classes of elements appear on the electronic screen. New and improved standards are constantly being created as the need and demand arise.

Typically, users of electronic devices have the option to override the default font size to adapt to the user's viewing circumstances, including changes in ambient light, motion, and vision prescription. Varying font size means that one user's page of viewed text may not look the same as another user's text even though they might both be reading the same material on identical electronic devices. This is generally not a problem for text-only material because text can be displayed in a variety of font sizes without loss of meaning or continuity.

When graphics are included, however, the situation becomes problematic because it is often desirable to have text and graphics on the same page—or at least near each other spatially. For instance, many text presentations contain additional material to supplement the primary text. In some cases, the supplementary material might appear as end-materials, such as appendices. At other times, the supplementary material is adjacent to the primary text, including graphic illustrations with explanatory notes. In printed books, much thought and planning is put into placing the supplementary material so as to keep the page visually attractive. At the same time, the primary text has to maintain flow and continuity. It can be a difficult task to maintain the balance and aesthetics between primary text and on-page supplementary material. In eBooks, simply changing the size of a single word in the primary text can sometimes cause a complete realignment of entire paragraphs of text. This realignment can cascade and cause portions of paragraphs to flow into a previous page or next page. Realignment of text as a result of font changes often requires the supplementary material to be repositioned. Thus, in fixed-font schemes, such as printed books or PDF documents, the images and text can be prearranged on the same page. With variable font, however, it becomes a more detailed task to have freely moveable graphics that are anchored to specific textual passages.

A fourth problem of displaying eBooks when graphics are present arises from a device's screen size, characteristics, and orientation. There are a large number of e-text capable devices on the consumer market, each of which has its own screen size and display characteristics. Text that is formatted with graphics for one specific screen may not work equally well for another screen, even though their aspect ratios may be the same (4:3 for instance). Of further consideration is the fact that there are at least two standards for screen presentations—high-definition (HDTV) and standard-definition (SDTV). Add to this the condition that most hand-held electronic devices (eReader, smart phone, tablet, etc.) allow the user to hold the device such that its longer side can be oriented either vertically (portrait mode) or horizontally (landscape mode). This collection of variables, including font size, screen size, presentation format, screen display characteristics, and orientation, means that graphics-embedded text is inconvenient to display except for a predetermined font/screen/format/orientation combination. FIG. 2 illustrates the problem of holding a display in different orientations while reading fixed-width content. A slide bar allows the user to manipulate the viewing window. However, this presents a cumbersome reading environment.

To address this last problem, the user may have the option of scrolling or dragging a reading window around, as in FIG. 2, but this makes for an uncomfortable and inconvenient reading environment. Another solution is to have a multitude of preformatted presentations tailored to specific devices and screen combinations. Such an approach may be useful where a market is dominated by one device or a few devices, such as the Apple iPad for tablets or the Amazon Kindle for eReaders. For a wider, generalized market, however, the issue of coherently presenting text and graphics becomes time consuming and labor intensive.

One recent trend in computing has been an increase in portable devices with smaller screens. Tablet-style computers typically offer either a 7-inch or a 10-inch diagonal screen. Designing content with an appealing mixture of text and graphics for these disparate screen sizes is not easily accomplished. And while consumers are often willing to accept smaller screens in exchange for increased portability, the smaller screens necessitate smaller graphics to allow adequate room for text. Finding the right mixture in a vastly reduced visual landscape can be a daunting task.

The present invention provides an improved electronic book reader for displaying and interacting with electronic content, giving users control over the timing and means by which supplementary materials may be accessed.

BRIEF DESCRIPTION OF THE DRAWINGS

Figure 1:
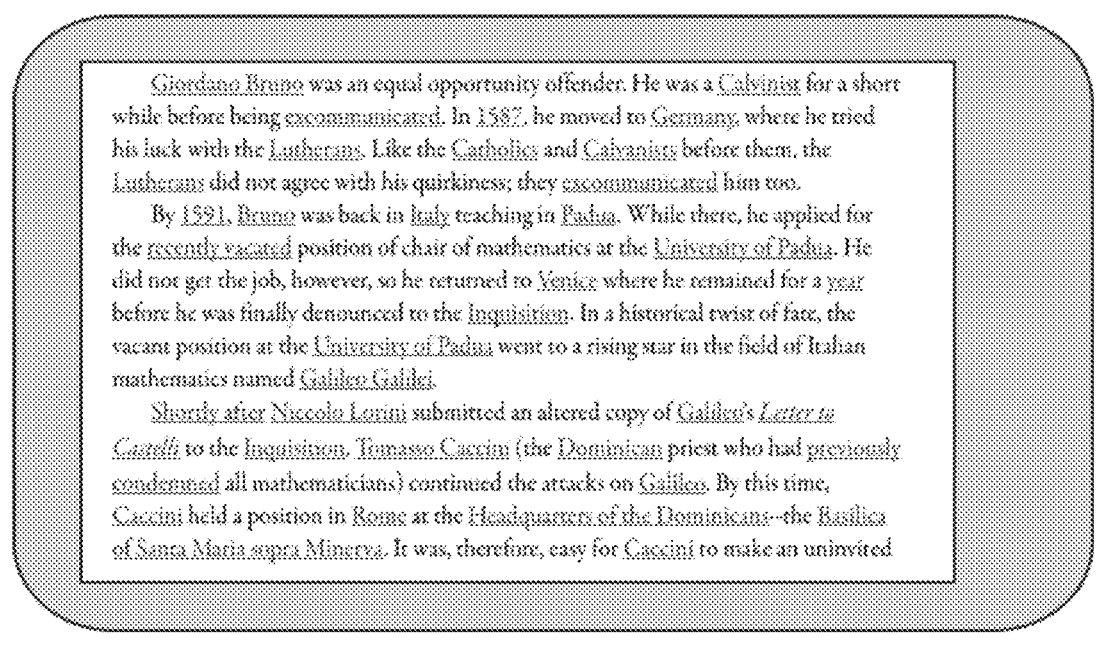

FIG. 1 illustrates an electronic book reader with linked text highlighted and underlined.

FIG. 2 illustrates an electronic book reader held in horizontal and vertical orientations.

FIG. 3 shows icons for supplementary content categories.

FIG. 10 is an electronic book reader with a video pop-up window.

FIG. 11 is an electronic book reader with an equation pop-up window.

FIG. 12 is an electronic book reader with a definition pop-up window.

SUMMARY OF THE INVENTION

An electronic book reader has an electronic book loaded in memory. The electronic book includes text, as well as markup tags around certain text portions. The markup tags indicate the availability of and link to supplemental content. A touch screen display allows a user to select a category of supplemental content or linked text. The display will show links for the category of content selected by the user, or will show categories of content for the linked text selected by the user.

DETAILED DESCRIPTION OF THE EMBODIMENTS

An electronic book reader has an electronic book loaded in memory. The electronic book includes text, as well as markup tags around certain text portions. The markup tags indicate the availability of and link to supplemental content. A touch screen display allows a user to select a category of supplemental content or linked text. The display will show links for the category of content selected by the user, or will show categories of content for the linked text selected by the user.

Figure 2A:
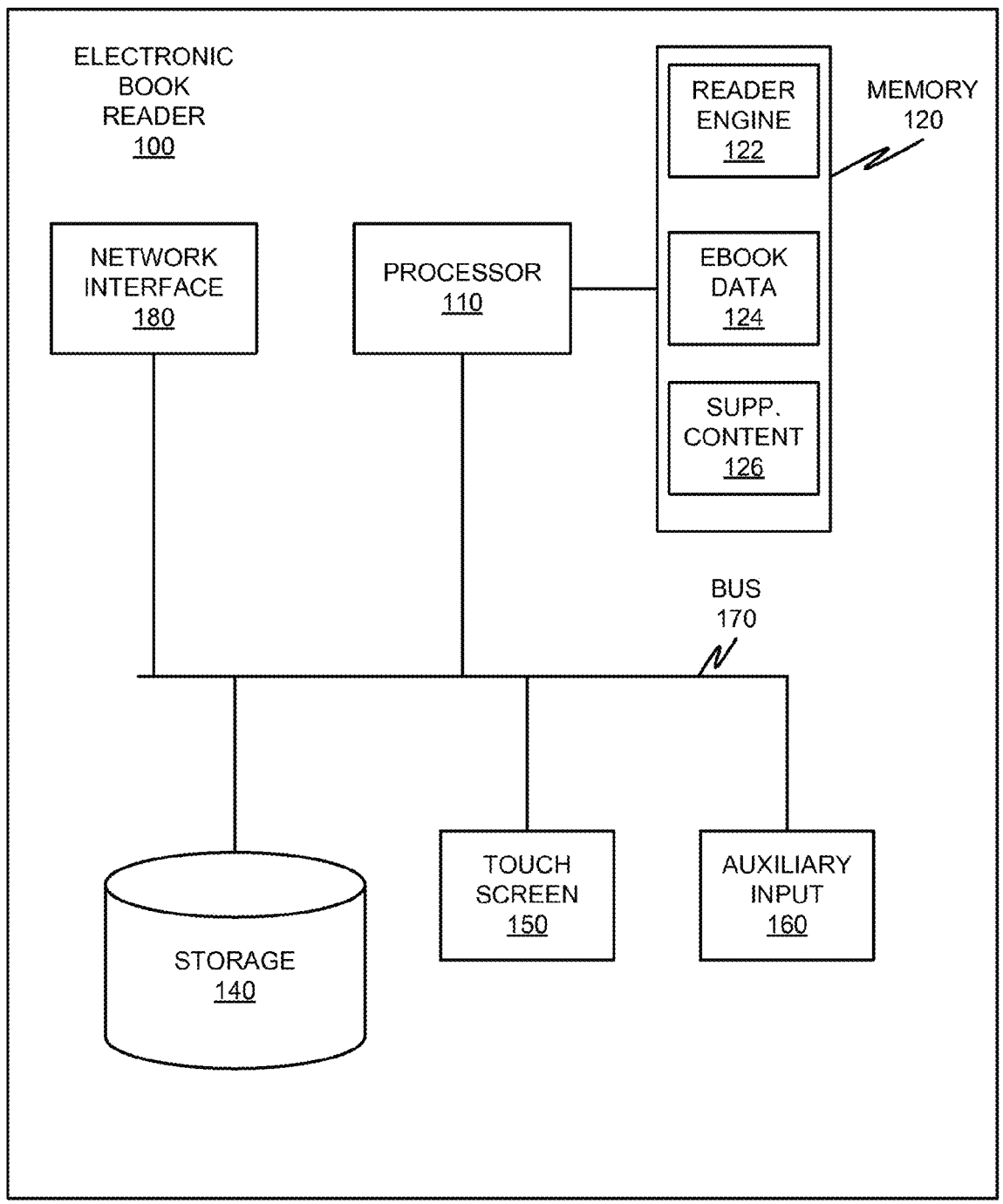
FIG. 2a is a block diagram of an electronic book reader.

FIG. 2a is a block diagram of an exemplary embodiment of an electronic book reader 100. Electronic book reader 100 is controlled by a processor 110, which may be a microprocessor, microcontroller, field-programmable gate array, application-specific integrated circuit (ASIC), programmable logic array, or other similar computing device. Processor 110 is communicatively coupled to a memory 120, which in an exemplary embodiment is a low-latency volatile random access memory (RAM), but which may be any suitable medium for storing and receiving computer-readable information. In some embodiments, memory 120 may be connected to processor 110 in a direct memory access (DMA) configuration for increased throughput. Memory 120 has stored therein a reader engine 122, electronic book data 124, and supplementary or additional content 126. Although memory 120 is disclosed as a separate functional unit, note that in some cases, some or all of the functions of memory may be served by other devices. For example, in the case of an ASIC, some or all of reader engine 122 may be encoded in hardware, while electronic book data 124 and supplementary content 126 may be provided by read-only memory (ROM) or other tangible storage media. The designations processor 110 and memory 120 are therefore understood to represent functional designations, the functions of which may be provided by one or more discrete hardware pieces.

Processor 110 may be communicatively coupled to other parts of the system via a bus 170. A touch screen 150 is provided as an exemplary combined input/output device. A touch screen 150 permits a user to provide input on the same surface on which he or she views output, typically using electronic buttons or menus, shown on the display or screen. Popular touch screens 150 currently available on the market include the E Ink Active Matrix imaging film. In other embodiments, auxiliary input 160 may be provided in addition to or instead of a touch screen. Auxiliary input 160 may include, for example, physical buttons (including power button, menu button, and unlock button), a keyboard, mouse, input gestures, motion-sensitive input commands, or voice commands. Additional appropriate hardware, such as keyboard or mouse drivers, a touch pad, accelerometer, microphone and/or speech recognition engine may be provided to enable auxiliary inputs 160.

A storage 140 is provided by way of example. Storage 140 may have stored therein a library of electronic books that may be loaded into memory 120 as requested by a user. In some embodiments, the function of storage 140 and memory 120 may be provided by a single physical device. Electronic book reader 100 may use a combination of remote and local storage 140. For example, the electronic book data 124 may reside on local storage, while the supplementary content 126 may reside on remote storage. In yet another embodiment, storage 140 may reside entirely on one or more remote servers or systems, with information loaded into memory 120 as needed.

A network interface 180 may also be provided, for example to enable synchronization with a desktop computer or remote access to an online electronic book service. This may enable a user to purchase, rent, or preview available electronic books.

A case or housing for electronic book reader 100 may also be provided. Electronic book reader 100 may include USB or other wired connections, as well as wireless capabilities. These network connections are particularly useful where storage is limited in the electronic book reader or where downloading and uploading of content to remote servers or systems is available. USB connections are also useful for charging batteries.

Electronic book data 124 may include primary content 125 and markup tags 134. Primary content 125 is configured to be formatted as a human-viewable information, such as text, pictures, or video. Primary content 125 may be further subdivided into discrete primary content units, such as words, letters, sound bytes, or discrete video clips. One or more primary content units may be associated with one or more markup tags 134. Markup tags 134 may be used to link parts of the primary content 125 to available supplementary content 126, as discussed in greater detail below. Markup tags 134 may include standard tag formats, such as HTML tags, as well as customized tag formats.

Supplementary content 126 is divided and stored in one or more classifications or categories 200. For example, the supplementary content 126 may be stored within the following categories 200: biographic material, graphic illustrations, photographic material, animations, video clips, audio clips, mathematical explanations, dictionary definitions, timeline of related events, geographic maps, experiments to support themes, charts, graphs, tables, citations, references, indices, appendices. The preceding list of categories 200 is illustrative, not exhaustive. Depending on the nature of the primary content, the audience, or other factors, the categories 200 could be expanded, reduced, or changed. For example, the categories 200 may group supplementary content 126 based on how individuals break down and store information in their own memory.

The display of electronic book reader 100 typically shows one or more icons 152 corresponding to the categories 200, usually one icon 152 for each category 200. FIG. 3 shows sample icons 152 for many of the categories 200 mentioned above. The icons 152 should be displayed on the electronic book reader 100 in vector format so they can be resized on the display or screen without loss of visual acuteness. Resizing allows adaptation to various screen sizes and attributes such as screen orientation. FIG. 3 illustrates three different states for each icon 152. The visual appearance of the icons 152 may be used to alert the user to the state of the icon 152. In particular, a half-intensity icon may represent an "unavailable" state, which means there is no supplementary content 126 available within the displayed text for the indicated category. The full-intensity icon 152 may represent the "available" state, which means there is supplementary content 126 within the displayed text for the indicated category. The full-intensity icon 152 with a darkened background may represent the "selected" state, which means the user has selected to have access to supplementary content 126 relating to a category 200.

Figure 4:
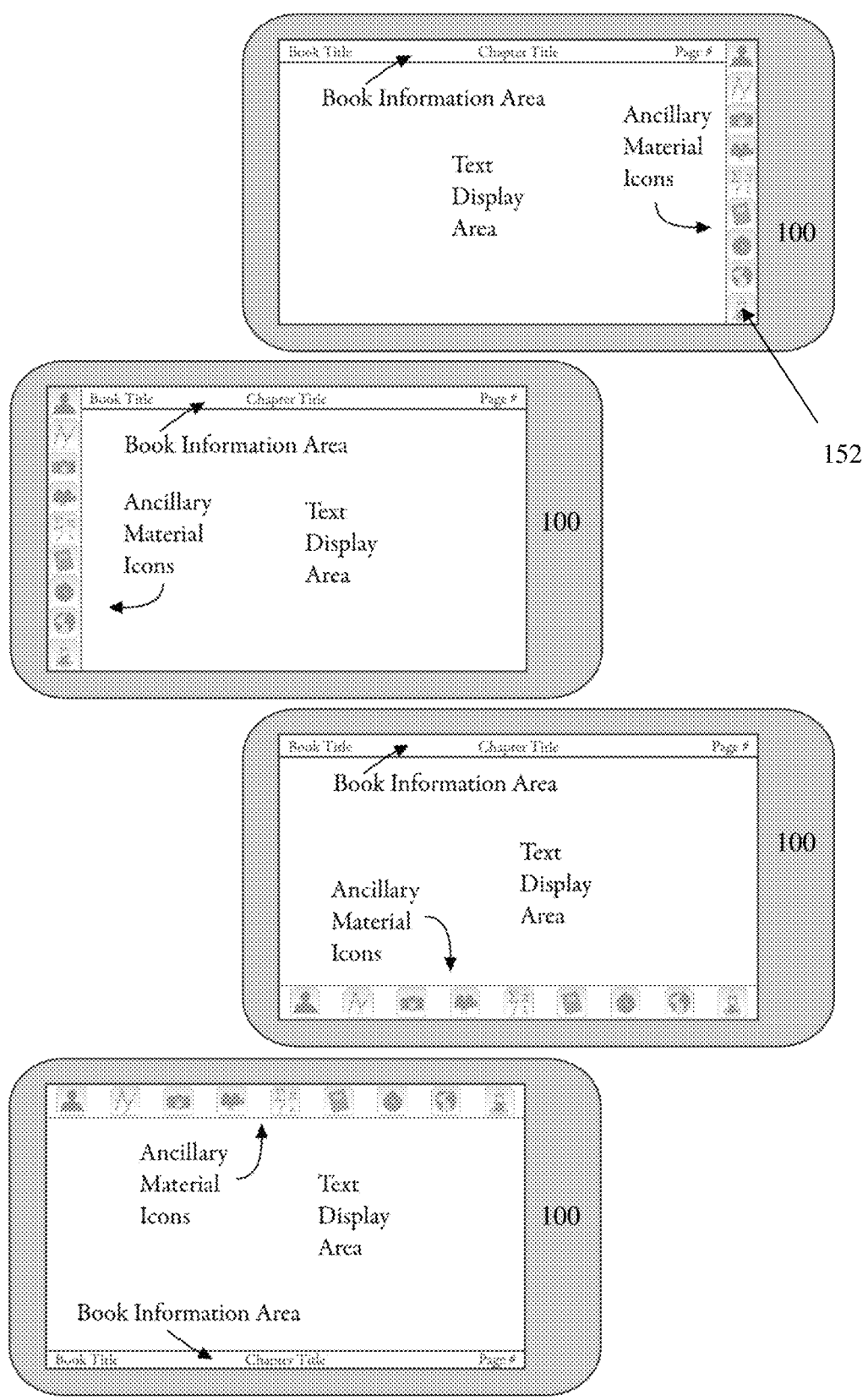
FIG. 4 illustrates several arrangements of icons on an electronic book reader screen.

The icons 152 in FIG. 3 may use a monochromatic scheme to accommodate non-color capable electronic screens. Alternatively, the icons 152 could be displayed using grayscale or in full color. FIG. 4 illustrates various arrangements of icons 152. Typically, the "default" position for icons 152 is on the right side of the screen or display. The electronic book reader 100 depicted in FIG. 4 is being held in the landscape position (i.e. longer side horizontal), but the same or similar arrangements of icons 152 would apply in the portrait position (i.e. longer side vertical). The placement and order of the icons 152 does not affect the operating procedure of electronic book reader 100.

Concerning the structure of data within the categories 200, each category 200 typically includes a list or array of zero or more of supplementary content elements 220. A supplementary content element 220 typically contains a supplementary content identifier 222 and supplementary content data 224. The supplementary content identifier 222 may be any string of characters, including letters and numbers, that distinguishes one supplementary content element 220 from another. Supplementary content data 224 may provide the additional material to be displayed or provide a link, such as an Internet link, to the additional material to be displayed.

In the following example, the <bios> tag defines a category 200 containing biographical information. The <bio> tag defines an supplementary content element 220. The "ref" attribute is used to define the supplementary content identifier 222 of "1." In this example, the supplementary content data 224 includes a title, source identifier, date of birth and date of death, and biographical data.

```
<bios>
    <bio ref="1">
        <title><b>Aristotle</b></title>
        <source>1</source>
        <born>at Stagira northern Greece in 384 BC</born>
        <died>at the Aegean Island of Euboea in 322 BC</died>
        <data> Aristotle was a pupil of the Greek philosopher Plato.
        In 342 BC, he was called to Macedon as the tutor to a young lad who
        was to become Alexander the Great. Aristotle wrote down the rules of
        Nature. He wrote on almost every subject imaginable, but particularly
        physics and astronomy. In physics, he said all matter consisted of the
        four elements: fire, air, earth, and water.</data>
    </bio>
</bios>
```

Typically, two supplementary contents elements 220 within the same category 200 may not use the same supplementary content identifier 222. However, two supplementary contents elements 220 in different categories may have the same supplementary content identifier 222.

In the second example below, the <ills> tag defines a category 200 containing illustrations. The <ill> tag defines a supplementary content element 220. The "ref" attribute is used to define the supplementary content identifier 222 of "a." In this example, the supplementary content data 224 includes a title, source identifier, illustration name, height, and width, and illustration data.

Figure 5:
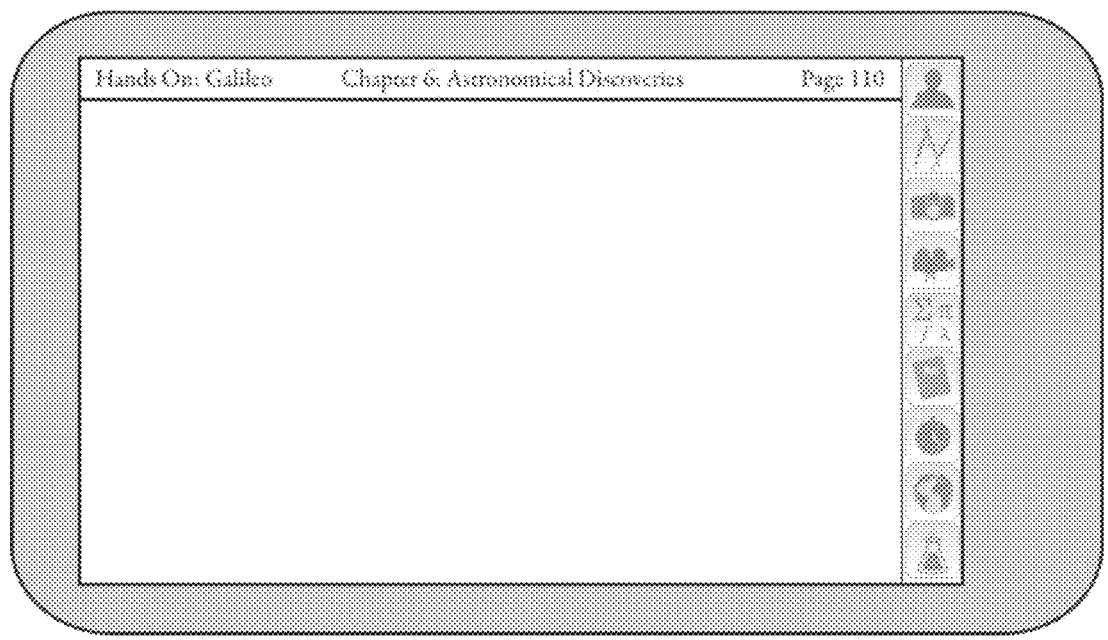
FIG. 5 is an electronic book reader display.

```
<ills>
    <ill ref="a">
        <title><b>Figure 5.1</b></title>
        <source>1</source>
        <name>Fig5_1.png</name>
        <height>110</height>
        <width>460</width>
        <data>A ball rolls down inclines of various angles</data>
    </ill>
</ills>
```

The structure of each supplementary content data 224 may vary from one category 200 to another, or even from one supplementary content element 220 to another. Accordingly, the reader engine 122 may process the supplementary content data 224 differently from one category 200 or supplementary content element 220 to another. For example, each category 200 may utilize a different subroutine or function to process supplementary content data 224.

As stated above, markup tags 134 may be used to create a relationship between the primary content 125 and the supplementary content 126. In particular, markup tags 134 may include links or pointers 240, used to link portions of the primary content 125 to the supplementary content 126. A pointer 240 comprises a pointer identifier 242 and a list or array 244 of supplementary content identifiers 222. The pointer identifier 242 may be any string of characters, including letters and numbers, that distinguishes one pointer 240 from another. The length of each list 244 equals the number of categories 200. In other words, a list 244 contains one supplementary content identifier 222 (or a null entry) for each category 200. Accordingly, each pointer 240 may be linked to supplementary content 126 in one or more categories 200, up to a maximum equal to the number of categories 200. The supplementary content identifiers 222 in a list 244 are generally ordered in a predetermined manner consistent with the categories 200.

In the following example, the <icon> tag is used to define a pointer 240, the "ref" attribute is used to define a pointer identifier 242, and the <links> tag defines a list 244 of supplementary content identifiers 222. Each list 244 in the example below contains nine elements and uses "0" as a null element.

```
<icons>
    <!-- bio        ill    pic   vid   eqn   def   tim   map   lab -->
    <icon ref="16">
        <links>0     0    39    0     0    32     0     0    0</links>
    </icon>
    <icon ref="telescope">
        <links>32  117    39    0    32   108   114    11   13</links>
    </icon>
</icons>
```

The above example contains two pointers 240, one with the number "16" as the pointer identifier 222 and another with the word "telescope" as the pointer identifier 222. The example uses <icon ref="ABC"></icon> as the markup tags 134 for a pointer 240, where ABC represents a string of characters.

A single supplementary content element 220 may be used in multiple different pointers 240. In the above example, the supplementary content element 220 identified as "39" is used in both the pointer 240 identified as "16" and the pointer 240 identifier as "telescope."

For example, the following snippet of primary content 125 might appear on the touch screen 150 of electronic book reader 100:

A Jesuit mathematician from the University of Ingolstadt, Christopher Scheiner, made recorded observations of sunspot activity in the early months of 1611. A year later, Scheiner wrote of his observations and interpretations of sunspot activity in Three Letters on Solar Spots. Schemer's tract was published by Marc Welser, who was a German patron of the sciences.

Using pointers 240, this might appear in electronic book data 240 as:

A <icon ref="106">Jesuit</icon> mathematician from the <icon ref="329">University of Ingolstadt</icon>, <icon ref="534">Christopher Scheiner</icon>, made<icon ref="605"> recorded observations</icon> of <icon ref="171">sunspot</icon> activity in the <icon ref="438">early months of 1611</icon>. A <icon ref="442">year later</icon>,<icon ref="534"> Scheiner</icon> wrote of his observations and <icon ref="105">interpretations</icon> of <icon ref="605">sunspot</icon> activity in <i><icon ref="178">Three Letters on Solar Spots</icon></i>. <icon ref="534">Scheiner's</icon><icon ref="181">tract</icon> was published by <icon ref="536">Marc Welser</icon>, who was a <icon ref="211">German</icon> <icon ref="132">patron</icon> of the sciences.

As shown in the above example, a single pointer 240 may appear multiple times in the primary content 125. For example, the <icon>pointer 240 identified as "534" appears three times, one time for each of "Christopher Scheiner," "Scheiner," and "Scheiner's" in the primary content 125.

The operation of electronic book reader 100 is now described in more detail. When electronic book reader 100 is powered-on or activated from standby, the attributes of touch screen 150 may be detected and the optimal size for icons 152 calculated. The placement and size of icons 152 (left, right, top, or bottom) as well as the order of icons 152 may be selected by a user, thereby creating a customized look and feel. Initially, the icons 152 are set to the unavailable state (half-luminosity) because no content is displayed. FIG. 5 shows the electronic display immediately after power up.

Processor 110 next uses reader engine 122 to parse the electronic book data 124 and display it on the touch screen 150. All standard HTML markup tags (bold, italics, paragraph, justification, etc) perform as usual. Touch screen 150 displays the primary content 125. When a pointer 240 is encountered, the reader engine 122 recognizes the availability of supplementary content 126, but does not display it. Instead, reader engine 122 changes the state of icons 152 to "available" state if any pointers 240 in the displayed portion of primary content 125 contain non-null entries in the list of supplementary content identifiers 244 for the corresponding category 200. This indicates to the user that highlighted icons 152 have associated supplementary content 126 for their corresponding category 200. None of the primary content 125 appears highlighted (i.e. linked) until the user interacts with touch screen 150.

Figure 6A:
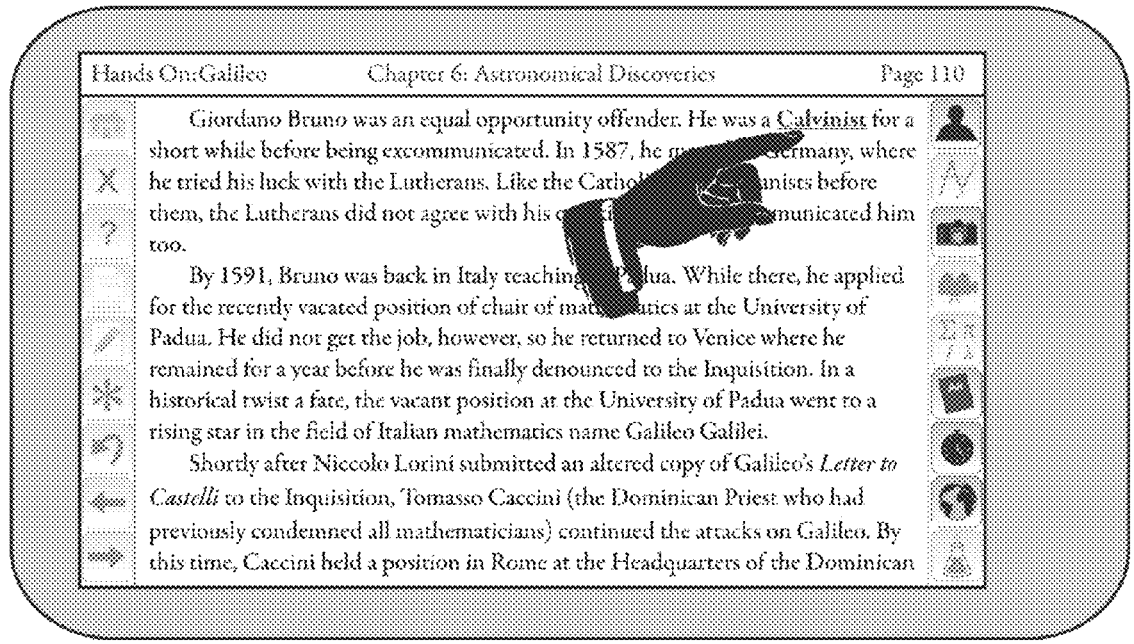
FIG. 6a shows an electronic book reader with words linked to supplementary content.
Figure 6B:
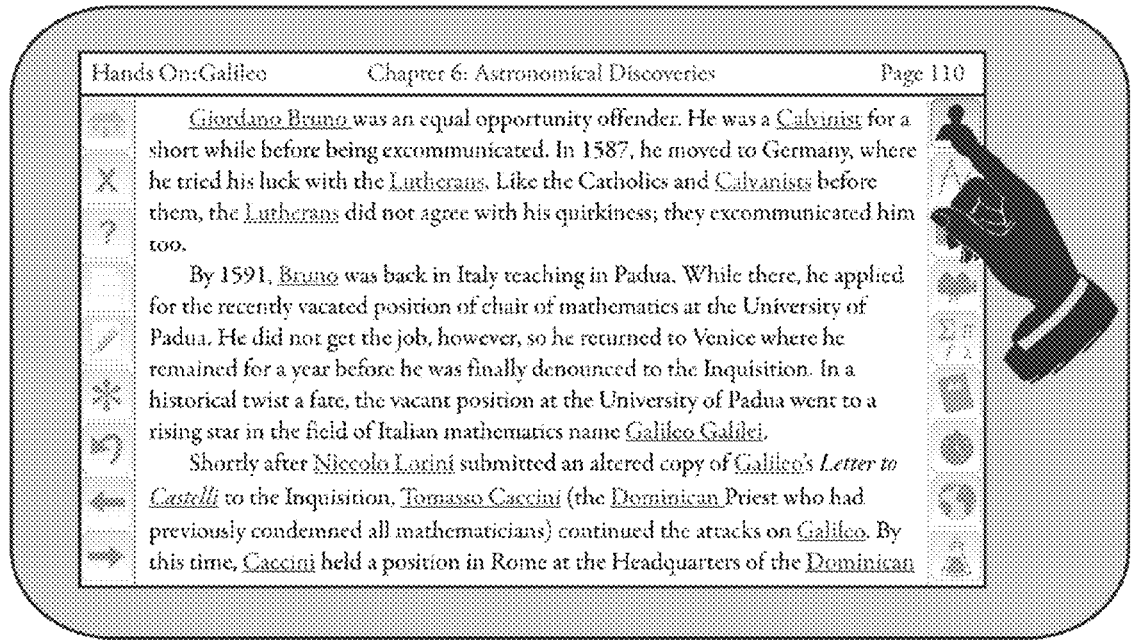
FIG. 6b shows an electronic book reader with icons linked to supplementary content.

Processor 110 may then receive from touch screen 150 a user command indicating mouse-over (or prolonged finger press) or selection (or mouse button click or finger tap) of either an icon 152 or text linked by a pointer 240. For example, FIG. 6a shows the selection of a word linked by pointer 240 ("Calvinist"). Selecting "Calvinist" shows that the word has linked supplementary content 126 including biography, picture, dictionary definition, timeline, and map information. FIG. 6b shows the selection of an available icon 152, the "biography" icon. As shown in FIG. 6b, the reader engine 122 highlights those parts of primary data 125 that are linked by pointers 240 with supplementary content 126 for biographical information.

In other words, if the user moves the cursor over a keyword linked by a pointer 240, that keyword changes its appearance to make the user aware that a linked keyword has been encountered. This change of appearance might be a change in font color and an underline. At the same time, the applicable icon 152 also changes appearance (i.e. states) to alert the user of any supplementary content 126 available for the keyword linked by pointer 240.

If the user moves the cursor off the keyword, the appearance of both the text and the icon return to their previous "normal" states. However, if the user clicks a mouse button while the cursor is over a keyword, then the keyword and the icons retain their visual change. This allows the user to move the cursor to a highlighted icon and click the mouse button to have the associated supplementary content 126 displayed. A second mouse click over the same keyword returns the state of the keyword and its associated icons 152 as though the action were a simple mouse-over.

Figure 6C:
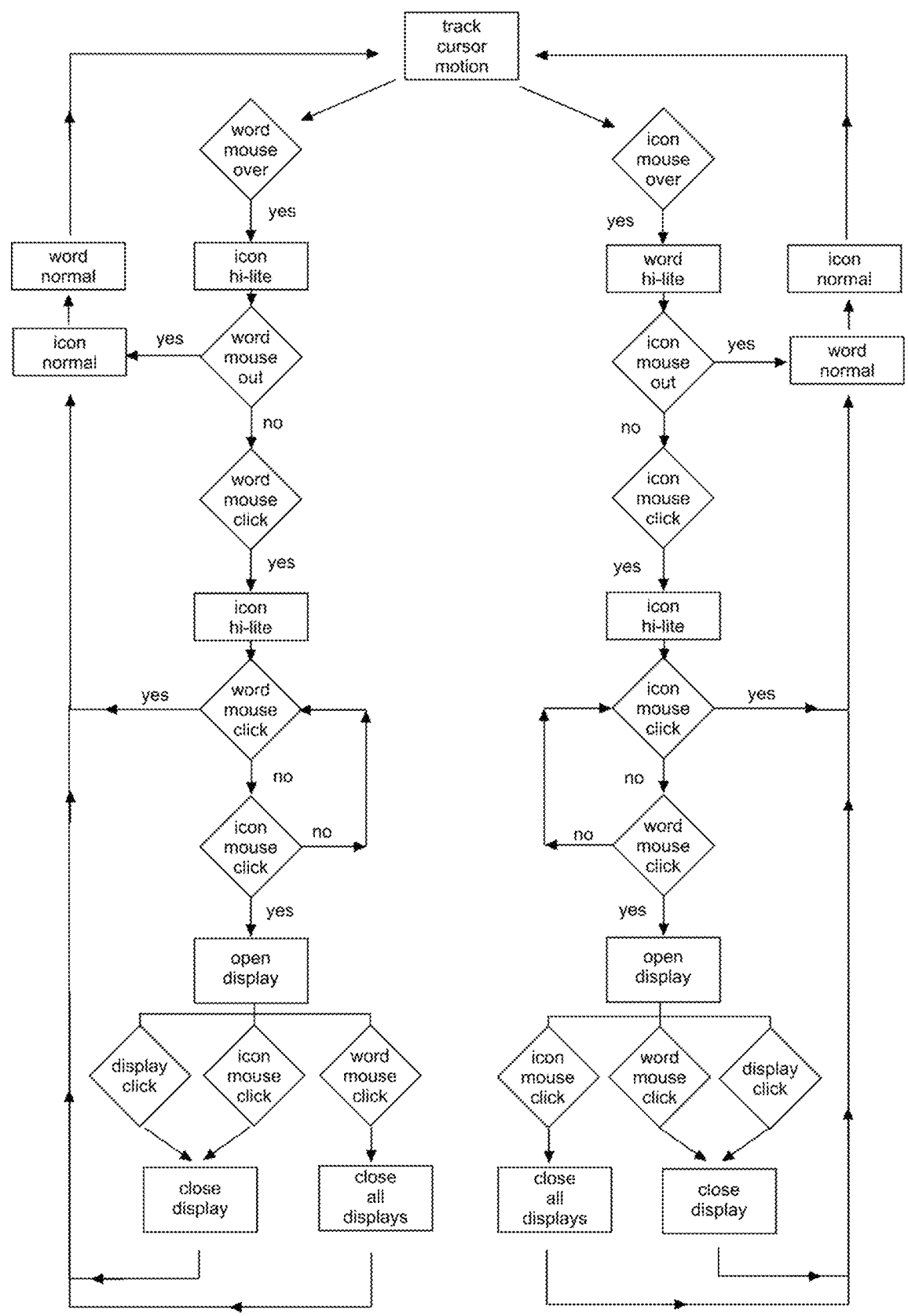
FIG. 6c is a flow-chart for mouse or touch control of an electronic book reader.

Alternatively, the user may gain access to the supplementary content 126 by performing the actions in the reverse order. That is, if no keyword is selected, and the user moves the cursor over an icon 152, then the icon 152 will highlight (assuming there are keywords present) and all keywords matching that icon 152 will highlight. If the user moves the cursor off the icon 152, then both the icon 152 and its matching keywords return to normal. If the user clicks on a highlighted icon 152, then the keywords retain their altered visual appearance so the user may move the cursor to a keyword and obtain the supplementary content 126 associated with the keyword. A second click on the same selected icon 152 returns the icon 152 and its associated keywords to a state as though the action were a simple mouse-over. FIG. 6c shows a flow chart illustrating the above-described controls of the electronic book reader 100.

The electronic book reader 100 presents the requested supplementary content 126 to the user. The supplementary material 126 may be of numerous forms and formats, and may be displayed in pop-up displays or windows. The popup windows may be initially sized and presented in the center of the screen. However, the user may resize or arrange the displays as desired.

Figure 7:
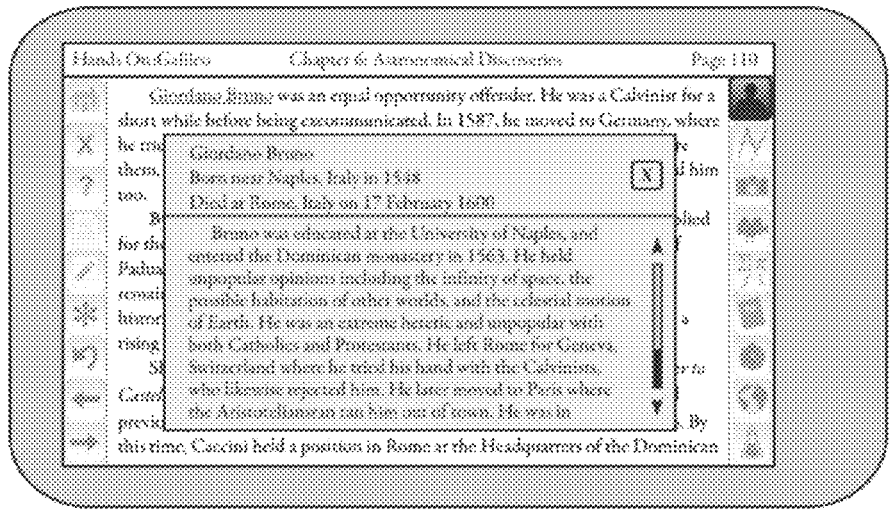
FIG. 7 is an electronic book reader with a biography pop-up window.
Figure 8:
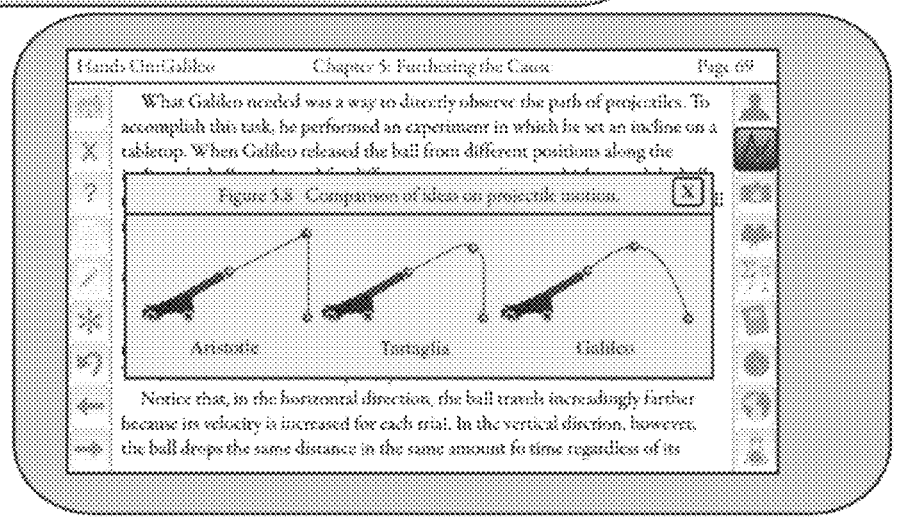
FIG. 8 is an electronic book reader with an illustration pop-up window.
Figure 9:
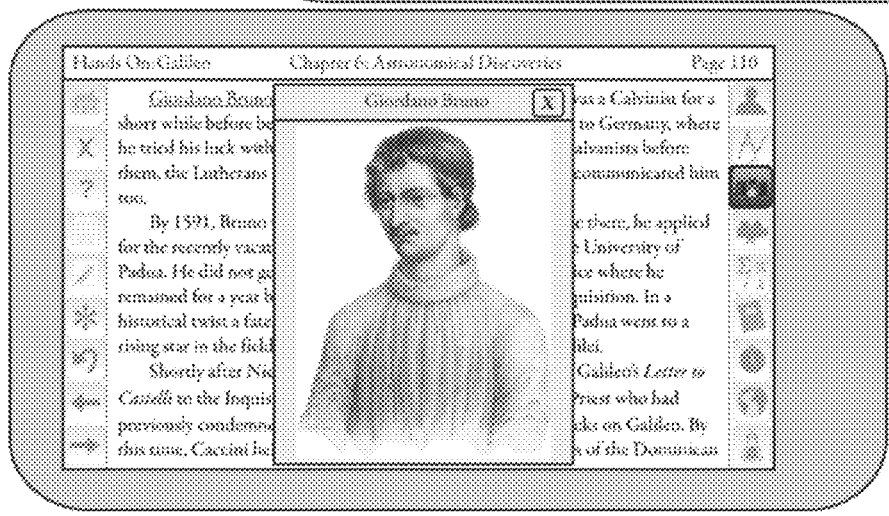
FIG. 9 is an electronic book reader with a picture pop-up window.
Figures 13, 14, 15:
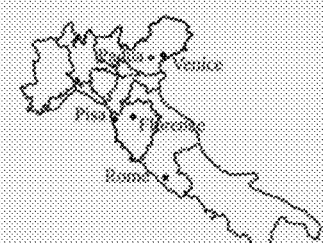
FIG. 13 is an electronic book reader with a timeline pop-up window.
FIG. 14 is an electronic book reader with a map pop-up window.
FIG. 15 is an electronic book reader with a laboratory pop-up window.

The nature of the supplementary content 126 (text, video, audio, etc.) typically influences how the information will be presented to the user. The reader engine 122 or its subroutines may be programmed to handle specific data types. FIG. 7 though FIG. 15 illustrate how the presentation might look for various supplementary content 126

Figure 16:
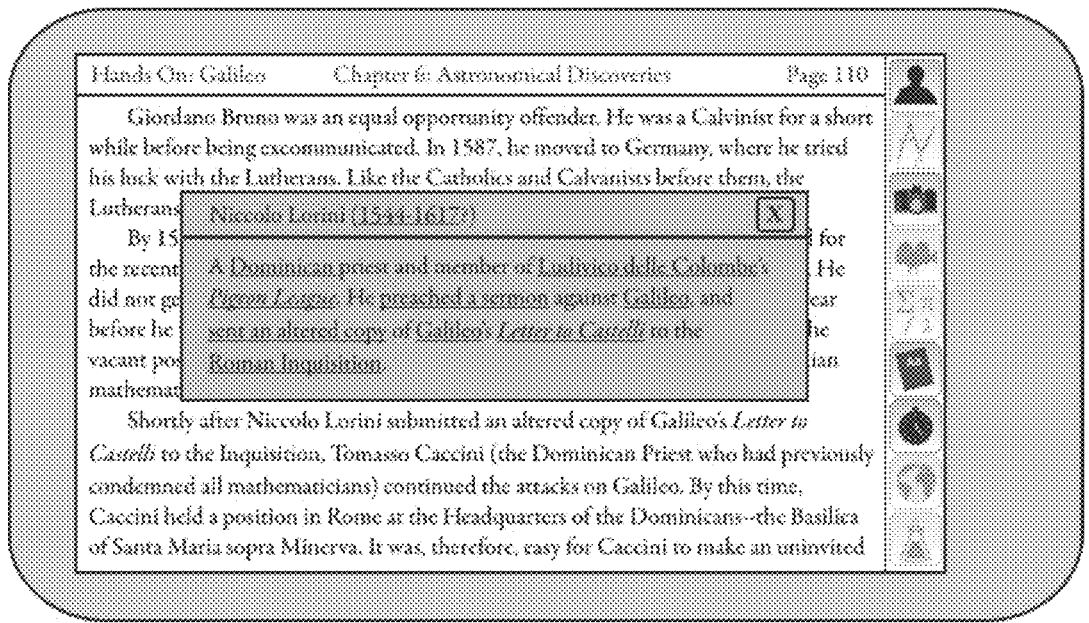
FIG. 16 is an electronic book reader with linked supplementary content.

In addition to linking within the primary content 125 of electronic book data 124, it is possible for supplementary content 126 itself to contain pointers 240 to additional supplementary content 126. For example, a pop-up display for biographic supplementary content 126 might contain additional links to other biographic material, photographs, timelines, etc. The highlighting and user interaction with text and icons in the supplementary content 126 may follow the process described above. The potential for linked supplementary content 126 may allow several layers of the supplementary content pop-up displays. Since it is possible to have numerous pop-up displays open on the screen at one time, the linking between keywords and category icons 152 would only be enabled for the topmost supplementary content screen. For example, when a pop-up display with supplementary content 126 is initiated, the state of the icons 152 may be updated to reflect the top (most visible) display area. As a user exits pop-up supplementary content displays, the icons 152 revert their states back to the next-topmost (most visible) display. FIG. 16 illustrates this multi-layered effect. The icons 152 of FIG. 16 reflect available supplementary content 126 in the pop-up display, rather than the underlying primary content 125.

Figure 17:
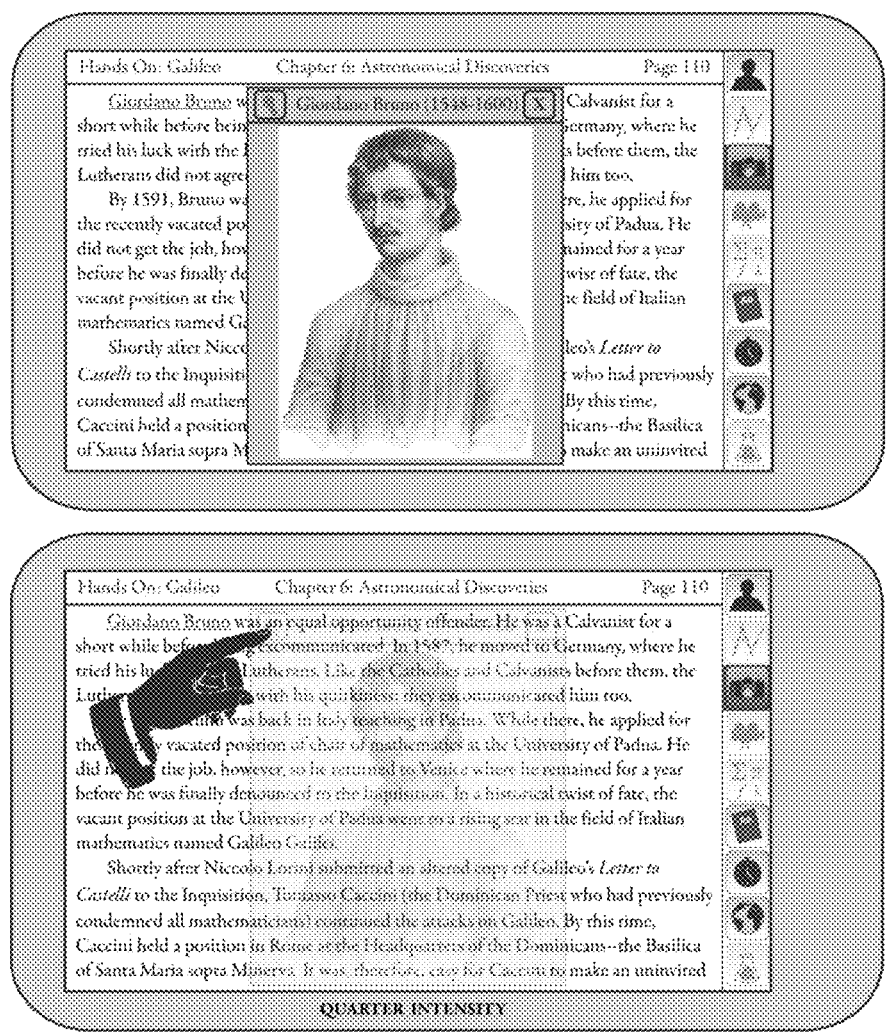
FIG. 17 shows an electronic book reader with a transparent pop-up display.

Another important consideration for implementing the icon/text/pop-up flow is making the primary content 125 more readable to the user and having the supplementary content 126 available at the user's discretion. Rather than simply exiting the pop-up display, the user may want the option of translating (moving) or resizing the pop-up display to reveal portions of text in the text display area. However, the size and placement of pop-up displays may not always allow the user to see the text effectively. An alternative procedure for making the underlying text readable is to have a control on the pop-up display that allows the display to exhibit transparency. The user could click/tap on an icon in the header portion of the popup display to toggle the display between opaque and transparent mode. FIG. 17 illustrates a pop-up window with selectable transparency. The pop-up display intensity should not be allowed to go to zero because that would create invisibility, such that the user would not know where the pop-up display controls are located.

Electronic book data 124 may be presented such that the electronic screen is analogous to a printed page. Accordingly, the entire screen represents a static page, and a request by the user for a new page is similar to turning the page in a book. Another common electronic presentation format is used by web sites and other text-presentation software. This format allows for a viewing window that scrolls up and down a continuous text display. If the viewing window is scrolled down, the material at the top of the screen disappears and new text appears at the bottom. If the viewing window is scrolled up, the material at the bottom of the screen disappears and new text appears at the top. The scrolling process is controlled by a scrolling bar placed on the screen's margin. Another popular scrolling method uses the central wheel on a mouse.

Adapting the invention disclosed herein to scrolling text would simply be a matter of using an alternative "bookkeeping." In particular, rather than processing text on a per-page basis, the software would process information contained in individual lines of text as they appear/disappear from the scrolling window. The overall methodology would be similar to the one outlined for pagination. Again, this is only a matter of internal bookkeeping details.

For some supplementary content 126, it might be advantageous to only divulge portions of the material at any one time. For instance, if the supplementary content 126 were a biographic entry for a supporting character in the main story, displaying the entire entry at once might give away the end of the story. This potentially conflicting situation could be handled by passing the link as a sub-group. Using a biographic entry, the supplementary content data 224 for Francesco Barberini might appear as:

Francesco Barberini was the nephew of Galileo's longtime supporter, Cardinal Maffeo Barberini. Francesco studied under Galileo and Benedetto Castelli at the University of Pisa. Galileo privately tutored Francesco to assist him in obtaining his law degree./1/Once Maffeo Barberini became Pope Urban VIII, he practiced large-scale nepotism by promoting family members to high positions within the Catholic Church. For example, Pope Urban saw to it that his brother, Antonio Barberini, and his nephew, Francesco Barberini, were elevated to the position of cardinal./2/Francesco championed Galileo's cause during Galileo's heresy trial in 1633. Francesco was one of the ten cardinals of the Inquisition who tried Galileo. It was Francesco who encouraged Commissary-General Vincenzo Maculano to negotiate a guilty plea from Galileo in exchange for leniency./3/Although the guilty plea was eventually obtained, the leniency did not follow. To show his dissatisfaction, Francesco was one of three cardinals who did not sign the Inquisition's indictment against Galileo. Francesco later spoke to his uncle, Pope Urban, on Galileo's behalf to have Galileo's life-long prison sentence reduced to house arrest.

This entry contains four distinct phases (three marked and an implied fourth at the end) of Galileo's life story where Francesco Barberini could be mentioned. Providing Francesco's entire biography too early in the story might be a plot spoiler. To avoid this situation, the pointer identifier 242 to the biography material might be a floating point number such as 32.2. In this instance, the whole number (32) would point to the biography of Francesco Barberini, and the modulo of the floating point number (2) would indicate to the output program to only display Barberini's biography up to the /2/ marker. If the pointer identifier 242 were a whole number or the modulo was 0, then the reader engine 122 would display the entire biography.

Also of relevance, the present invention is well-adapted for remote content storage, since text-only files are small in size compared to files that are heavily laden with graphics. On the other hand, slow wireless download times can severely limit a user's willingness to download large data files. The present invention can be modified to download only the text portion of content. As the user requests supplementary content, it can be downloaded and presented one request at a time. This piecemeal downloading means that a large download can be spread over a longer time span.

In addition, remote access and storage implies the capacity to create centralized data centers to support electronic text. Unlike the internet in general, a centralized data center offers the opportunity to create an authoritative data source. When properly maintained, the centralized data source can service numerous electronic texts that are not exact copies. That is, numerous versions of electronic texts may reference the same materials, which are downloaded via the output program from a single source. For instance, there may be a multitude of electronic books with different titles that have some common supplementary content—biographies, maps, definitions, etc. Further, a central source can provide material that is reader appropriate. For instance, assume a centralized data base of supplementary biographies. Further, assume individual biographies are aimed at different educational reading levels—elementary, secondary, high school, college, etc. The user's electronic texts could be set to retrieve reader-sensitive biographies. In practice, there might be four biographies at a central source for Galileo Galilei—each one aimed at a targeted reading level for the four educational groups previously listed. Within a specific electronic text title, the supplementary reference for Galileo might be 128.E, which would indicate Galileo as the 128th entry, and E as the elementary level version of Galileo's biography.

While the subject of this specification has been described in connection with one or more exemplary embodiments, it is not intended to limit the claims to the particular forms set forth. On the contrary, the appended claims are intended to cover such alternatives, modifications and equivalents as may be included within their spirit and scope.

LIST OF REFERENCE NUMBERS electronic book reader 100
processor 110
memory 120
reader engine 122
electronic book data 124
primary content 125
supplementary content 126
markup tags 134
storage 140
touch screen 150
icons 152
auxiliary input 160
bus 170
network interface 180
classifications or categories 200
list of supplementary content elements 210
supplementary content element 220
supplementary content identifier 222
supplementary content data 224
link or pointer 240
pointer identifier 242
list of supplementary content identifiers 244

What is claimed is:

1. An electronic media reader comprising:
an input device for receiving input from a user;
an output device for providing output to a user;
memory comprising:
enhanced electronic material comprising primary content that includes a number of primary content units and embedded markup tags, the markup tags identifying primary content units that have secondary data associated with them;
electronic supporting data comprising primary data elements containing pointers to secondary data elements by category and secondary data elements containing category-specific content;
instructions; and
a processor, when executing the instructions:
formatting enhanced electronic material for display by the output device;
displaying a portion of the enhanced electronic material on a first portion of the output device, the displayed enhanced electronic media including a plurality of primary content units;
displaying a plurality of icons associated with categories of secondary data on a second portion of the output device, each icon being associated with a different category of secondary data;
associating primary content units with secondary data category icons;
monitoring user input received through the input device;
determining whether a request for a category-specific secondary data element associated with a displayed primary content unit has been received; and
displaying the requested secondary data element on a specified portion of the output device if a request for a category-specific secondary data element associated with a displayed primary content unit has been received.

2. The electronic media reader of claim 1, wherein the secondary data elements are arranged by category.

3. The electronic media reader of claim 1, wherein the processor determines whether a primary content unit and an associated secondary data category icon have been selected on the display to determine whether a request for a category-specific secondary data element associated with a primary content unit has been received.

4. The electronic media reader of claim 3, wherein, to determine whether a primary content unit and an associated secondary data category icon have been selected, the processor:
determines whether one of the secondary data category icons on the display has been selected;
causes category-associated primary content units in the displayed electronic material to be designated on the display if a category icon has been selected, the designation prompting user selection of a primary content unit associated with the category of the selected category icon; and
determines whether a designated primary content unit on the display has been selected.

5. The electronic media reader of claim 4, wherein the processor:
determines whether a second designated primary content unit has been selected; and
displays an additional secondary data element associated with the selected category icon on a specified portion of the output device if a second designated primary content unit has been selected.

6. The electronic media reader of claim 5, wherein the display of the additional secondary data element overlaps the display of the first secondary data element.

7. The electronic media reader of claim 5, wherein the processor rearranges a display stack containing the display of the additional secondary data element and the first secondary data element such that any selected secondary data element will move to the topmost visual layer.

8. The electronic media reader of claim 5, wherein the processor closes the display for the first secondary data element based on user deselection of the associated primary content unit.

9. The electronic media reader of claim 5, wherein the processor closes the display for the first secondary data element and the display for the additional secondary data element based on user deselection of the associated category icon.

10. The electronic media reader of claim 3 wherein, to determine whether a primary content unit and an associated secondary data category icon have been selected, the processor:
determines whether a primary content unit on the display has been selected;
causes icons of secondary data categories associated with the selected primary content unit to be designated on the display, the designation prompting user selection of a category icon associated with the selected primary content unit; and
determines whether a designated category icon on the display has been selected.

11. The electronic media reader of claim 10, wherein the processor:
determines whether a second designated category icon has been selected; and
displays an additional secondary data element associated with the selected primary content unit on a specified portion of the output device if a second designated category icon has been selected.

12. The electronic media reader of claim 11, wherein the processor closes the secondary data element display associated with the first selected category icon and the secondary data element display associated with the second selected category icon based on user deselection of the selected primary content unit.

13. The electronic media reader of claim 11, wherein the processor closes the secondary data element display associated with the first selected category icon based on user deselection of the first selected category icon.

14. The electronic media reader of claim 1, wherein the processor displays the requested secondary data element over at least part of the first portion of the output device.

15. The electronic media reader of claim 14, wherein the processor adjusts the transparency of the display of the requested secondary data element relative to any underlying enhanced electronic material.

16. The electronic media reader of claim 1, wherein the processor:
detects user input indicating that the displayed enhanced electronic media is to be moved;
determines whether a portion of the displayed enhanced electronic media has been moved off the output device; and
removes the portion of the displayed enhanced electronic media from display on the output device if the portion has been moved off the output device.

17. The electronic media reader of claim 16, wherein the processor:
  determines if a primary content unit having an associated markup tag and a displayed associated secondary data element has been moved off the output device;
  closes the display for the associated secondary data element if a primary content unit having an associated markup tag and a displayed associated secondary data element has been moved off the output device; and
  displays a second portion of the enhanced electronic material on the output device.

18. The electronic media reader of claim 1, further comprising a network interface communicatively coupled to the processor and configured to provide communication with a remote electronic media service.

19. The electronic media reader of claim 1, wherein each markup tag associates a primary content unit with a pointer to a primary data element within electronic supporting data.

20. The electronic media read of claim 19, wherein the processor analyzes the markup tags and the primary data elements to create a linking structure between primary data elements and secondary data category icons to associate primary content units with secondary data category icons.

21. The electronic media reader of claim 20, wherein the processor determines the association between primary content units and secondary data category icons as the primary content units are displayed on the output device.

22. The electronic media reader of claim 1, wherein the processor creates a linking structure between content units in the secondary data elements and secondary data category icons to associate content units in the secondary data elements with secondary data category icons.

23. The electronic media reader of claim 1, wherein the processor:
  determines whether a display indicator has been moved to the vicinity of an unselected secondary data category icon on the display; and
  causes primary content units associated with the unselected secondary data category icon in the displayed electronic material to be designated on the display if a display indicator has been moved to the vicinity of an unselected secondary data category icon, the designation informing a user of primary content units that have secondary data elements associated with the category of the category icon.

24. The electronic media reader of claim 1, wherein the processor:
  determines whether a display cursor indicator has been moved to the vicinity of an unselected primary content unit on the display; and
  causes icons of categories associated with the unselected primary content unit to be designated on the display if a display indicator has been moved to the vicinity of an unselected primary content unit, the designation informing a user of category icons associated with the primary content unit.

25. The electronic media reader of claim 24, wherein the processor:
  determines whether the display indicator has been moved away from the vicinity of the unselected primary content unit on the display; and
  causes icons of categories associated with the unselected primary content unit to be undesignated on the display if the display indicator has been moved away from the vicinity of the unselected primary content unit.

26. The electronic media reader of claim 1, wherein the processor displays different secondary data for a primary content unit depending on where the primary content unit appears in the displayed material.

27. The electronic media reader of claim 26, wherein a primary content unit has a first markup tag associated with it at one point in the displayed material and a second markup tag associated with it a second point in the displayed material, the first markup tag pointing to a first primary data element and the second markup tag pointing to a second primary data element.

28. The electronic media reader of claim 1, wherein the processor displays the same secondary data for different primary content units.

29. The electronic media reader of claim 28, wherein a first primary content unit and a second primary content unit are associated with a primary data element.

30. The electronic media reader of claim 1, wherein the processor continues to display the plurality of icons on the second portion of the output device when a second portion of the enhanced electronic material is displayed in the first portion of the output device, the second portion of the enhanced electronic media containing at least one different primary content unit than the first portion of the enhanced electronic media.

31. The electronic media reader of claim 30, wherein the second portion of the enhanced electronic media contains completely different primary content units than the first portion of the enhanced electronic media.

32. The electronic media reader of claim 30, wherein the plurality of icons are displayed in the same order when displaying the first portion and the second portion of the enhanced electronic media.

33. The electronic media reader of claim 30, wherein none of the primary content units in the second portion of the enhanced electronic media are associated with at least one of the displayed secondary data category icons.

34. The electronic media reader of claim 1, wherein the memory comprises an array that defines the categories of secondary data based on array locations and associates the primary content units with the categories.

* * * * *